J. P. Reynolds,
Animal Stock.
Nº 71,788.   Patented Dec. 3, 1867.
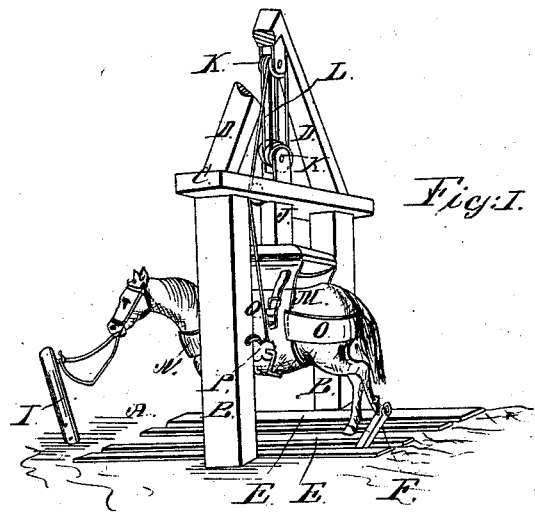
Fig. 1.
Fig. 2.
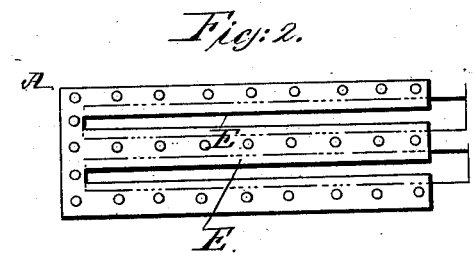
Fig. 3.   Fig. 4.
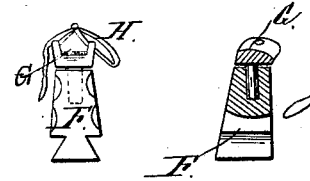
Witnesses:
Theo Fricke
J. A. Servue
Inventor:
J. P. Reynolds
Per Munn & Co
Attorneys

United States Patent Office.

JOHN P. REYNOLDS, OF MIRABILE, MISSOURI.

Letters Patent No. 71,788, dated December 3, 1867.

---

IMPROVED HORSE-HOLDER.

---

The Schedule referred to in these Letters Patent and making part of the same.

---

TO ALL WHOM IT MAY CONCERN:

Be it known that I, JOHN P. REYNOLDS, of Mirabile, in the county of Cardwell, and State of Missouri, have invented a new and improved "Holder for Horses;" and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim, and desire to have secured to me by Letters Patent.

The present invention relates to a holder for horses while being shod, which holder is constructed in such a manner and so applied to the horse as to occasion no injury to him, and without the least danger of accident or injury to the person operating upon or shoeing the horse. In the accompanying plate of drawings, my improved holder for horses is illustrated—

Figure 1 being a perspective view of the holder from one side, and

Figures 2, 3, and 4, detail views.

A, in the drawings, represents a platform, which may be the floor of a room, stable, or other place, and B two uprights or posts, secured in floor. These posts B, at their upper ends, are connected together by a cross-rail, C, and from the upper side of that rail extend angular inclined braces D, which meet at their upper ends. E E, dove-tail grooves, made in floor A, in directions parallel to each other. F, a post, inserted in one of the grooves E, wherein it is arranged so as to be slid forward and backward. G, a block, swivelled to upper end of sliding post F, which block is adapted for use as a rest to the foot or hoof of a horse, for securing which a strap, H, is employed. I, a post, at one end of platform A. J, a post, suspended by pulleys, K, and ropes, L, to and from the upper end of the inclined braces D. This post passes loosely down through the cross-rail C, and to its other lower end is secured a leather band, of suitable length, to pass around and be buckled about the body of a horse, and of a suitable width to produce no uncomfortable feeling to the horse, if suspended by it above the platform A. This body-band M is provided with straps, N and O, for passing around both the front and rear of the horse. With the pulleys K and ropes L, a windlass, P, is connected, through a rope, Q, in such a manner that the winding up of the rope Q upon the windlass P will raise the body-band M, and the unwinding thereof lower the same.

In the use of my improved holder, hereinabove described, the horse is first hitched to the post, and then secured in the body-band M, by buckling the same together and fastening the front and rear straps N and O, when, winding up the rope Q upon the windlass, the horse is thereby raised from the ground or platform A, and the hoof then secured or strapped upon the rest-block G, provided for it, where it is in a most convenient position for being shod or operated upon, and without the least danger of injury to the animal or the person, as is obvious without any further explanation.

Having thus described my invention, I claim as new, and desire to secure by Letters Patent—

1. The construction of the holder for horses, consisting of the wide body-band M, having the front and rear straps N D, the upper ends of the body-band M secured to the platform having the central post J, passing loosely through the cross-bar C, and elevated by means of the pulleys K, rope L, and windlass P, all arranged and operating as herein described, for the purpose specified.

2. I also claim the swivelled rest-blocks for the horse's hoofs, arranged in grooves or ways, substantially as described.

J. P. REYNOLDS.

Witnesses:
WM. H. HURLBUT,
JAMES MYLAR.